J. MURRAY.
VENTILATING APPARATUS.
APPLICATION FILED MAY 7, 1917.
1,247,314.
Patented Nov. 20, 1917.
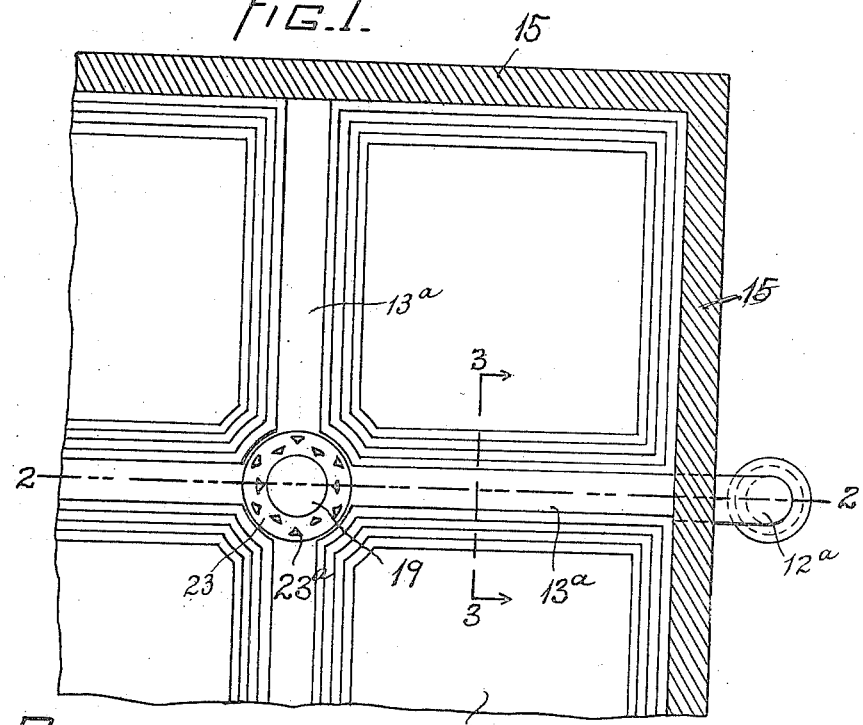
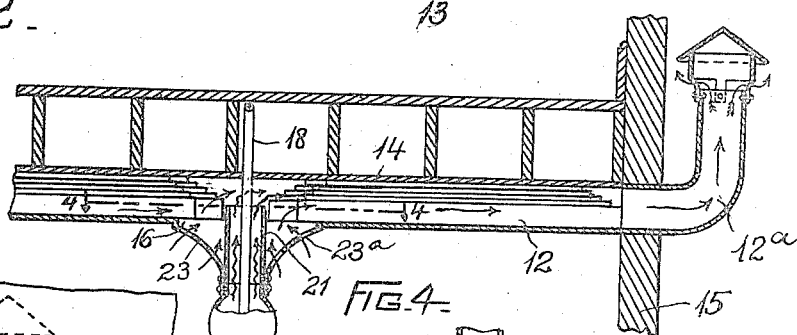
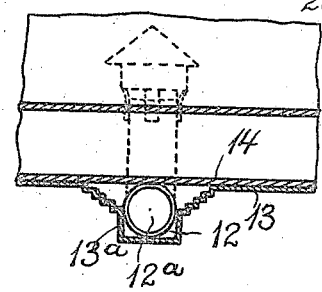
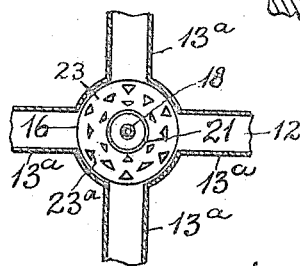
INVENTOR
James Murray
by Knight Brown Quinby May
ATTYS.

UNITED STATES PATENT OFFICE.

JAMES MURRAY, OF BOSTON, MASSACHUSETTS.

VENTILATING APPARATUS.

1,247,314.　　　　　Specification of Letters Patent.　　Patented Nov. 20, 1917.

Application filed May 7, 1917. Serial No. 166,791.

*To all whom it may concern:*

Be it known that I, JAMES MURRAY, a citizen of the United States, residing at Boston, in the county of Suffolk and State of Massachusetts, have invented new and useful Improvements in Ventilating Apparatus, of which the following is a specification.

This invention relates to means for ventilating a room by withdrawing air through the ceiling thereof, the air thus withdrawn being discharged outside the room.

The invention has for its object to provide a ventilating apparatus or system which includes a lamp adapted to illuminate the room and to cause the heat developed by the lamp to induce a flow of air from the upper portion of the room into and through a ventilating flue extending outwardly from the room.

The invention is embodied in the improvements which I will now proceed to describe and claim.

Of the accompanying drawings forming a part of this specification,—

Figure 1 is a bottom plan view of a portion of the ceiling of a room and of a gas lamp supported below the ceiling, the vertical wall portions being shown in section.

Fig. 2 is a section on line 2—2 of Fig. 1.

Fig. 3 is a section on line 3—3 of Fig. 1.

Fig. 4 is a section on line 4—4 of Fig. 2.

The same reference characters indicate the same parts in all of the figures.

In the drawings, 12 represents a ventilating flue, the main portion of which is horizontal. As here shown, the bottom wall and side walls of said flue are portions of a hollow elongated boss 13$^a$ integral with the sheet metal ceiling 13 of the room, and simulating a beam. The top wall of the flue is formed by a structural part 14 to which the ceiling 13 is attached. The flue has an elbow-shaped extension or terminal 12$^a$, passing through a wall 15 of the room.

The bottom wall of the flue 12 is provided with a relatively large opening 16 constituting the air inlet or intake of the flue.

Below the flue 12 is supported a lamp which is adapted to illuminate the room and is preferably of the inverted gas arc type, the burner of the lamp being preferably provided with an incandescing mantle, such as the well known Welsbach mantle, and supplied with gas by a gas pipe 18. As here shown, the lamp includes an inverted light-transmitting globe 19.

The lamp is provided with a vertical tube 21 suitably extending upwardly from the globe 19 into the opening or air intake 16, said tube constituting a chimney which conducts hot air and products of combustion from the lamp through the intake 16 and into the flue 12, as indicated by the zigzag arrows in Fig. 1.

The diameter of the intake 16 is considerably greater than that of the tube or chimney 21, so that a flow of cooler air from the upper portion of the room is induced through the space between the margin of the opening and the chimney, as indicated by the curved arrows in Fig. 2. The vitiated air from the upper portion of the room is therefore forcibly drawn therefrom into the flue 12 and discharged outside the room, the products of combustion being similarly discharged.

To conceal the opening or intake 16 and provide an ornamental finish around the chimney 21 and a support for the latter, I provide a foraminous hood 23, which is preferably of approximately conical form and made of stamped or pressed sheet metal, the base or larger end of the hood being suitably attached to the bottom of the flue 12, and its smaller end to the chimney 21, said chimney being supported and concealed by the hood. The openings 23$^a$ formed by suitably perforating the hood, are sufficient in number and size or area to permit free passage of air through the hood to the intake 16.

The lamp here shown is well known as the Humphrey inverted gas arc lamp. I do not, however, limit myself to this particular lamp structure and may use as an element of the combination hereinafter claimed any lamp adapted to be supported below and near the ceiling of a room, or that portion of the ceiling which is formed by the bottom of the flue 12, and provided with a chimney formed and arranged to extend through said ceiling portion and into said ventilating flue.

The lamp and the air inlet 16 may be located at the intersection of two bosses or imitation beams 13ᵃ, as indicated by Figs. 1 and 4, and each of said bosses may form a ventilating flue portion.

The chimney 21 extending from the lamp through and above the air intake 16 into the flue 12, constitutes an ejector element adapted to conduct a jet of mingled hot air and products of combustion into the flue and utilize the force of said jet to lift air from the top of the room into the flue. The intake 16 constitutes an ejector element through which the air from the top of the room is lifted. The foraminous hood 23 attached to the bottom wall of the flue 12 and to the chimney 21, constitutes an extension of the last mentioned ejector element, the intake and hood constituting a relatively large conduit surrounding the smaller conduit formed by the chimney, and the arrangement being such that the jet of hot air and products, from the lamp, passing from the smaller conduit or chimney, tends to cause any air within reach at the top of the room to rise in the larger conduit.

I claim:—

In combination, a fixed horizontal ventilating flue located at the ceiling of a room and having in its bottom wall an air intake communicating with the top of the room and constituting an ejector element, and at one end an air outlet outside the room, a lamp located below the said flue and intake, and a vertical chimney extending from the lamp through said intake into the flue, and constituting an ejector element adapted to conduct a jet of hot air and products of combustion into the flue and utilize the force of said jet to lift air from the top of the room through said intake into the flue.

In testimony whereof I have affixed my signature.

JAMES MURRAY.

Copies of this patent may be obtained for five cents each, by addressing the "Commissioner of Patents, Washington, D. C."